April 28, 1942. A. J. HOLMAN 2,280,825
COMBINED FIRE SHUTTER AUTOMATIC CONTROL AND
FILM MOVEMENT STABILIZING DEVICE
Filed Nov. 22, 1938 3 Sheets-Sheet 1
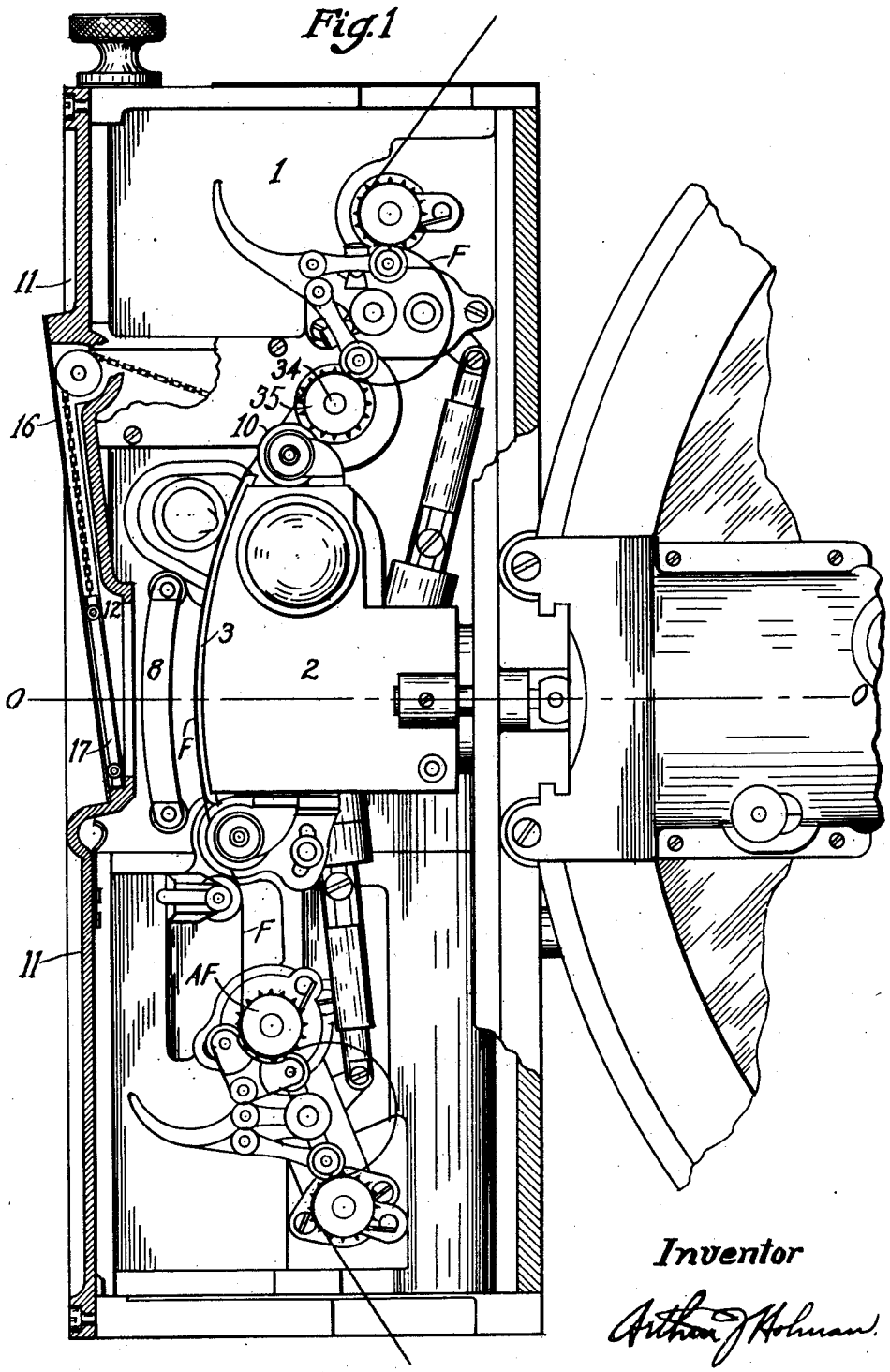
Inventor
Arthur J Holman April 28, 1942.  A. J. HOLMAN  2,280,825
COMBINED FIRE SHUTTER AUTOMATIC CONTROL AND
FILM MOVEMENT STABILIZING DEVICE
Filed Nov. 22, 1938  3 Sheets-Sheet 2
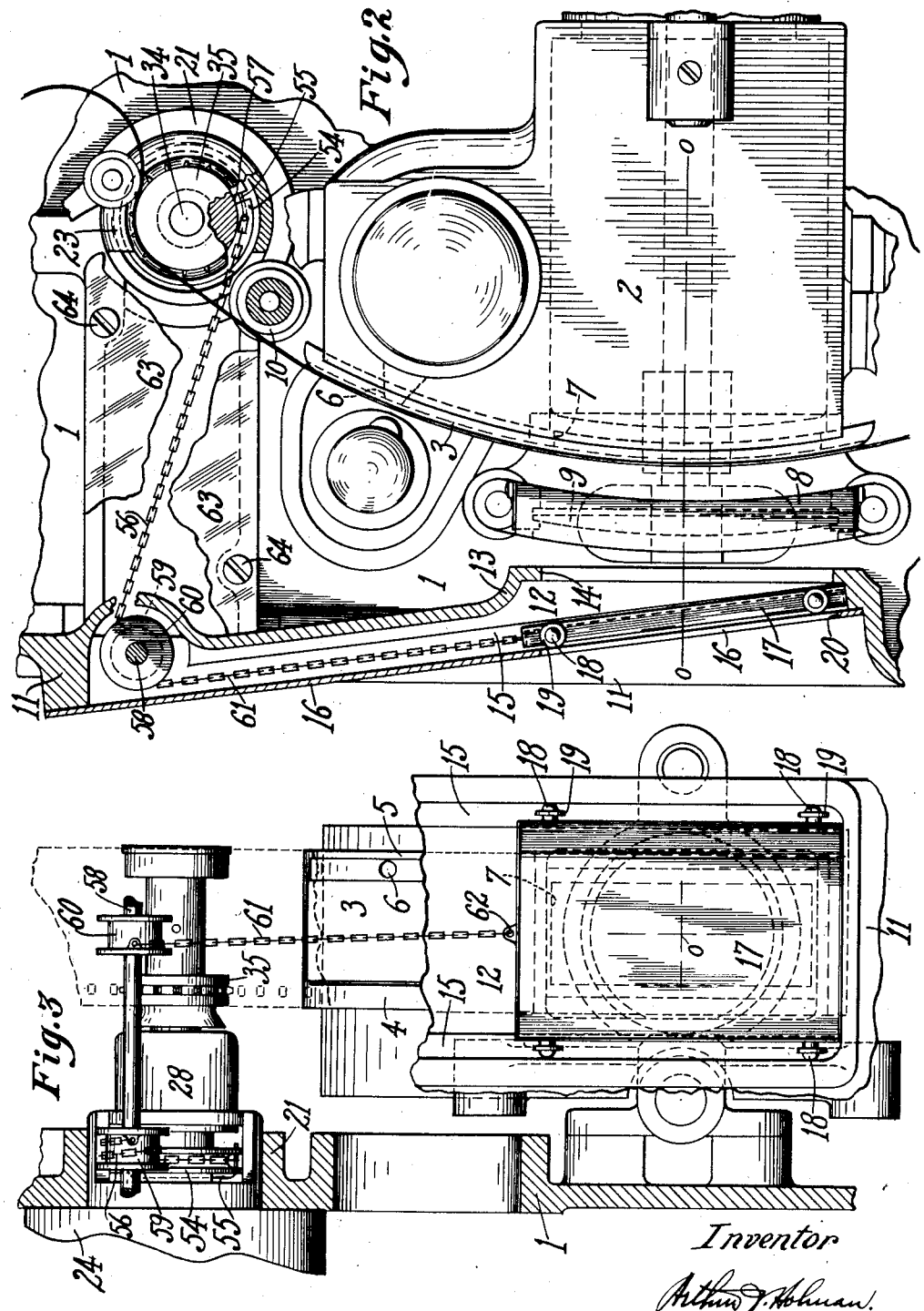
Inventor
Arthur J. Holman

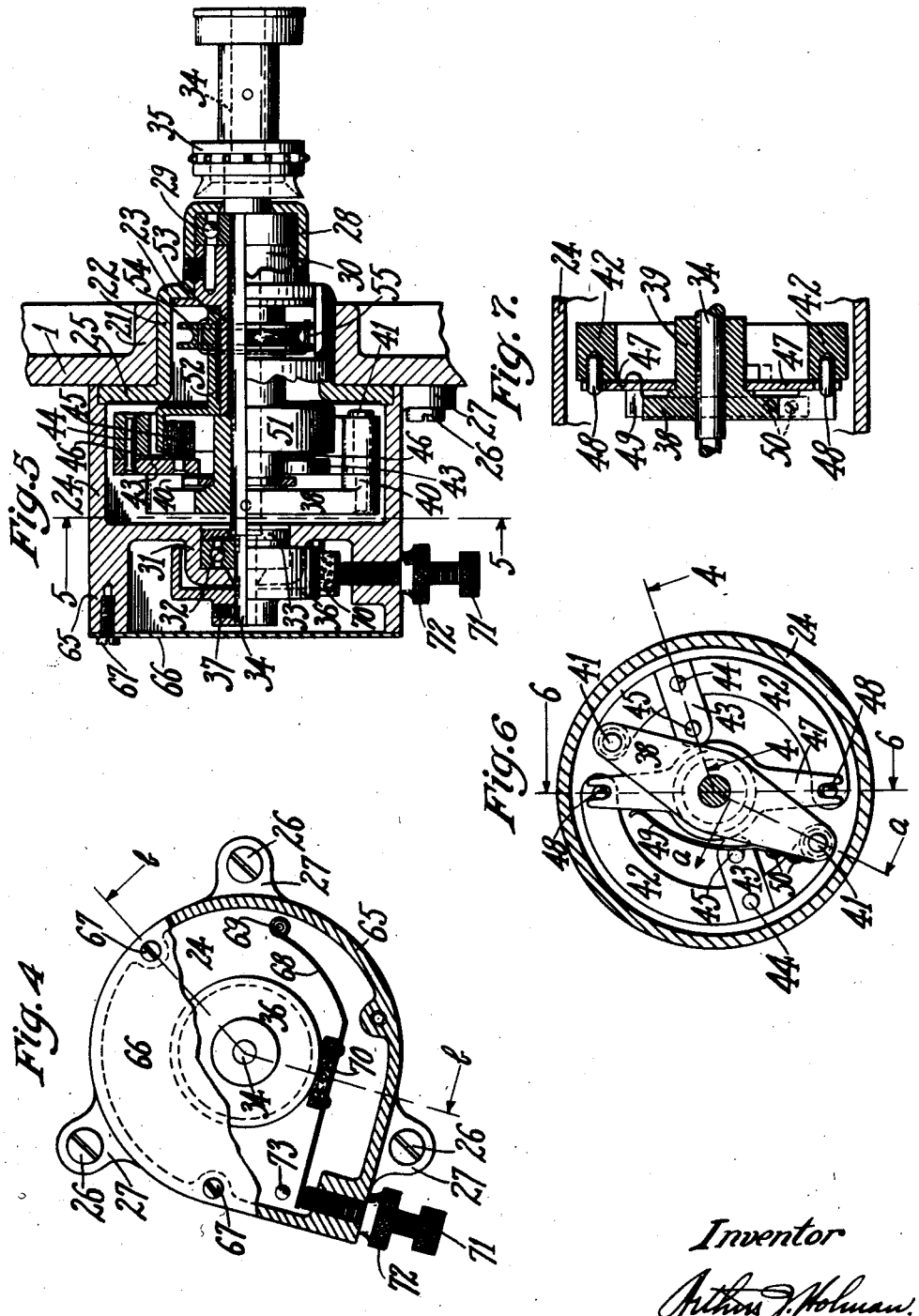

Patented Apr. 28, 1942

2,280,825

UNITED STATES PATENT OFFICE 2,280,825

COMBINED FIRE SHUTTER AUTOMATIC CONTROL AND FILM MOVEMENT STABILIZING DEVICE

Arthur J. Holman, East Orange, N. J.

Application November 22, 1938, Serial No. 241,840

8 Claims. (Cl. 88—17)

The present application is a continuation-in-part of application Serial No. 756,036, filed December 5, 1934, for a Combined fire shutter automatic control and film movement stabilizing device.

My invention relates to a combined fire shutter automatic control and film movement stabilizing device, and is applicable to motion picture projecting apparatus wherein the film strip is moved continuously (non-intermittently) over the aperture plate during projection. My present device is designed for use in connection with a sound and picture aperture unit and film feeding mechanism such as is described in Letters Patent of the United States No. 2,120,249, dated June 14, 1938, and when so used, it not only eliminates fire hazard at the aperture and retains the film strip in contact with the aperture plates but also prevents sprocket tooth ripple and other irregularities in film movement over sound and picture apertures. This invention is an improvement over the apparatus disclosed in Letters Patent of the United States No. 1,835,159, dated June 8, 1931, and differs essentially therefrom in that it is designed to perform the extra function of stabilizing film movement over an aperture unit which has no friction shoes.

My device is especially effective as a film movement stabilizer because it applies force to the film only by means of the teeth on the control sprocket and hence its action upon the film is exactly complementary to the action of the feed sprocket. With my apparatus, the principal forces acting upon the film overlying the aperture unit, are opposite in direction, substantially equal in magnitude, and they are applied to the film in identical manner, hence the resultant film movement across the apertures is perfectly uniform.

It has been the special object of my invention to provide a centrifugal mechanism which will apply a steady unvarying friction load on the control sprocket when operated at constant speed. I have also provided means whereby additional load may be applied in small increments till the total load at operating speed is just sufficient to insure perfect contact of the film strip with the runners on the aperture plate. The additional load applied to the control sprocket for the purpose of stabilizing film movement is effective also in reducing the time interval required for shutter closing. Since this load is independent of centrifugal force, it dissipates quickly the kinetic energy of the control mechanism whenever a film break occurs at the aperture thereby accelerating the closing of the fire shutter. It has been the further object of my invention to provide an improved automatic fire shutter mechanism which may always be depended upon to raise the fire shutter, when the projector is in normal operation, no matter how careless the projectionist may have been in lubricating the projector mechanism. Other advantages of my present device will be fully described hereinafter.

My device may be best understood by reference to the accompanying drawings in which Fig. 1 is a view into the operating side of a projector mechanism showing arrangement of aperture unit and film feeding sprockets.

Fig. 2 is an enlarged view showing part of the aperture unit and the improved fire shutter and automatic control mechanism, parts being cut away to show the fire shutter mechanism.

Fig. 3 is a rear view of the mechanism shown in Fig. 2, parts of the frame being broken away to show relative positions of essential parts of the fire shutter and its operating mechanism.

Fig. 4 is a view into the non-operating side of the projector mechanism, showing the fire shutter control unit with parts of the case broken away to show the adjustable means for changing the additional load applied to the fire shutter control sprocket.

Fig. 5 is a sectional view through the axis of the control unit, the sections being taken as hereinafter described.

Fig. 6 is a sectional view on line 5—5 of Fig. 5, showing the centrifugal mechanism.

Fig. 7 is a sectional view on line 6—6 of Fig. 6, illustrating the interconnection between the centrifugal weights.

In Fig. 5, the section shown above the shaft is taken through the centrifugal mechanism as shown on line 4—4 of Fig. 6, whereas the section below the shaft shows the centrifugal mechanism positioned as on line a—a of Fig. 6. Also in Fig. 5 the section through the upper part of the case to the left of line 5—5, and through the friction shoe, is taken on line b—b of Fig. 4, whereas the section through the bottom of the case to the left of line 5—5, is taken through the axis of the adjusting screw.

Referring now more specifically to the drawings in which like reference numerals indicate like parts, I (Figs. 1, 2 and 3) is the upper main frame member of a projector mechanism to which is attached in a slidable manner the aperture frame 2, the aperture frame being adjustable along the optical axis O—O, of the projector objective system as more fully described in Letters Patent of the United States No. 2,120,249 hereinabove referred to. Attached to aperture frame 2, is the aperture plate 3, having integral wide raised curved runner 4, and narrow raised curved runner 5, and containing sound aperture 6, and picture aperture 7, the latter being symmetrically placed with respect to the optical axis O—O of the projector objective. Aperture frame 2, also carries aperture lens mount 8, wherein is mounted aperture lens 9, the latter being placed symmetrically with respect to picture aperture 7, and in close proximity thereto. A lateral guide roller 10, carried at the top of aperture frame 2, as more fully described in the above mentioned Letters Patent, serves the double purpose of positioning the film strip F (Fig. 1), correctly with respect to the sound and picture apertures in aperture plate 3, and directing the film strip in such a manner that it enters upon aperture plate 3, tangent to the surface of the raised curved runners 4 and 5, no matter where the aperture unit may be positioned, within the limits of its slidability, along the optical axis O—O.

Attached to main frame member 1, is mechanism rear cover plate 11, which encloses the entire projector mechanism at the rear, and within cover plate 11, is formed the fire shutter housing 12, the forward wall 13, of which contains the aperture 14, which is symmetrically positioned with respect to the optical axis O—O. Guide-ways 15, at either side of fire shutter housing 12, and fire shutter housing cover plate 16, complete the fire shutter housing and provide tracks whereon the fire shutter 17, may move to open or closed position. Guide-ways 15, lie in a plane at right angles to mechanism main frame member 1, as shown in Figs. 2 and 3, but this plane is not at right angles to optical axis O—O. Fire shutter 17, comprises a flat metallic plate having flanged edges to increase its stiffness, and into the side flanges are secured the rivets 18, whereon freely rotate the rollers 19, the latter contacting with cover plate 16, and guide-ways 15, and rolling thereon whenever the fire shutter opens or closes. The fire shutter and its housing are so constructed that the head of rivets 18, and rollers 19, have sufficient clearance within the guide-ways to prevent jamming of fire shutter 17. An aperture 20, in fire shutter housing cover plate 16, is directly opposite and somewhat larger in size than aperture 14, in fire shutter housing 12. The guide-ways 15, which determine the direction of travel of the fire shutter, as it opens and closes, are positioned at an acute angle to mechanism rear cover plate 11, to minimize the friction between fire shutter and guide-ways and to increase the downward component of gravitational force on the fire shutter when the mechanism is tilted to the average projection angle which obtains in threatre installations. The object is to make fire shutter 17, as nearly "free falling" as possible for reasons hereinafter more fully explained.

An annular boss 21 (Figs. 2, 3 and 5), integral with main frame member 1, is bored to receive turned portion 22, of the member 23, which, together with the member 24, comprises the case wherein is contained the fire shutter control mechanism. Case member 23, has an integral flanged portion 25 (Fig. 5), which fits against a finished surface on the back of main frame member 1, and is turned at its periphery to fit snugly into a turned seat in case member 24, both case members being held together and in proper position on main frame member 1, by the screws 26 (Figs. 4 and 5), which pass through lugs 27, integral with case member 24, and are threaded into main frame member 1. A bearing housing 28, integral with case member 23, supports the ball bearing 29, which is retained in place by the sleeve 30, the latter being press fitted into bearing housing 28. A bearing housing 31, integral with case member 24, supports the ball bearing 32, in alignment with ball bearing 29, ball bearing 32 being retained in position by the ring 33, which is press fitted into bearing housing 31.

Within ball bearings 29 and 32, is journaled the control sprocket shaft 34, to one end of which is pinned the control sprocket 35. The other end of shaft 34, which projects through bearing housing 31, carries the friction drum 36, which is retained thereon by the set screw 37. Within case member 24, and fixed on control shaft 34, is the centrifugal control mechanism which is constructed in the following manner. A two-arm spider 38 (Figs. 5, 6 and 7), provided with the hub 39, fits snugly over shaft 34, and is pinned thereto. At the extremity of each arm on spider 38, is an integral boss 40, into which is press fitted and riveted a shouldered pin 41, wherein is hingedly supported a centrifugal weight 42, which is retained in position by the head on pin 41. Each centrifugal weight 42, which is somewhat less than half a ring, is milled out to receive a lug 43, which is secured to weight 42, by a rivet 44. Lug 43, projects radially inward from weight 42, and into its end is riveted the fluted pin 45, whereon is pressed a leather friction member 46. An inter-connecting link 47, turning freely on hub 39 of spider 38, is slotted at each end to fit with slight clearance over a pin 48, press fitted into the swinging end of each centrifugal weight 42. A leaf spring 49, attached to spider 38, by the screws 50, presses against inter-connecting link 47, thereby exerting pressure tending to swing the free end of each weight 42, against the hinged end of the other, thus forcing the centrifugal weights toward the center of shaft 34.

A friction drum 51 (Fig. 5), having a long offset hub 52, rotates freely on an annular projection 53, integral with sleeve 30, and is retained thereon by hub 39, on spider 38. Friction drum 51, is so positioned within the centrifugal mechanism that the centrifugal weights clear its outer surface when the mechanism is at rest, i. e., when centrifugal force is zero; and the leather friction members 46, contact with and exert pressure against its inner surface when the mechanism is in normal operation, i. e., when film is running at normal speed across aperture plate 3. Integral with offset hub 52, is the pulley 54, whereon is mounted the spring member 55, which is fixed in one hole below the groove in pulley 54, and projects through two opposite holes in the flanges above the groove at a position approximately 180 degrees from where its opposite end is secured in the pulley. The portion of spring member 55, projecting through the flanges on pulley 54, serves as a pin and secured the chain 56 (Figs. 2 and 3), to pulley 54. To facilitate removal and insertion of the chain, the flanges of pulley 54, are cut away as shown at 57 in Fig. 2, so a small screwdriver may be pressed against spring member 55, thus drawing its free end from the groove of pulley 54. Control case member 23, is cut away to expose pulley 54, as shown in Fig. 3, and chain 56, may be attached to or released from pulley 54, when the control mechanism is in position in mechanism main frame member 1, by operating with a screw driver as above through this opening in case member 23.

A shaft 58, is rotatably mounted in the upper part of fire shutter housing 12, and is suitably supported to prevent end play. On shaft 58, and in alignment with one side of pulley 54, is fastened the wide grooved pulley 59, to which is secured, by any suitable means, the other end of chain 56, the latter being attached to that flange of pulley 59, which is not in alignment with pulley 54. A wide grooved pulley 60, is fastened on shaft 58, in such position that the vertical plane through the optical axis lies somewhat closer to one flange of pulley 60, and a chain 61, is attached at one end to the other flange of pulley 60, and at its other end to a lug 62, on fire shutter 17. The pulleys 59 and 60 are of small diameter, and shaft 58, must make slightly less than two revolutions to raise fire shutter 17, to its open position. Pulley 54, is twice the diameter of pulley 59 therefore it makes slightly less than one revolution in lifting the fire shutter to open position. The chains 56 and 61, are just long enough to allow a little slack when the fire shutter is in closed position. The alignment of the pulleys is such that the turns of the chains 56 and 61, on pulleys 59 and 60 respectively, will not overlap and become tangled as the fire shutter is alternately raised and lowered by automatic action of the control mechanism.

When chain 56, has been attached to pulleys 54 and 59, the cover plate 63 (Fig. 2) is attached to main frame member 1, by the screws 64, thus sealing the control mechanism and the chain channel from the film compartment of the projector mechanism. In this manner all possibility of intentional or accidental interference with the fire shutter and its automatic control mechanism, is eliminated.

Theatres in general are constructed in such manner that the projectors are located considerably above the center of the screen, and it is therefore necessary to tilt the mechanisms at an angle to the horizontal in order to center the projected image on the screen. This angle may vary from zero to perhaps as much as 18 degrees downward from the horizontal, and in the average installation, which incidentally represents the condition in by far the greater number of theatres, the angle of tilt is probably close to 12 degrees. Since a gravity actuated fire shutter will fall most quickly if it is free to fall in a vertical direction, and since projectors are almost universally tilted downward, it is obvious that the fire shutter will fall more quickly in the average installation, if its guide-ways are positioned at an angle approximately 78 degrees to the optical axis. By thus taking into consideration the average angle of tilt and designing the fire shutter housing accordingly, I have increased the effectiveness of my fire shutter mechanism.

The fire shutter and its operating mechanism are made relatively light in weight, so the shutter may be "quick acting," and the centrifugal mechanism is so designed that the torque applied to friction drum 51, at normal projection speed, is not greatly in excess of the amount required to lift the fire shutter, hence the drag applied to the film strip by the fire shutter, per se, is relatively light. Occasionally it may be necessary, particularly with old and badly buckled film, to apply more drag on the film to keep it in contact with the aperture plate, and it is chiefly for this reason that provision is made to apply additional increments of load on control sprocket shaft 34.

Control case member 24, is provided with an extension 65 (Figs. 4 and 5), which projects beyond the bearing housing 31, a sufficient distance to enclose friction drum 36; and the compartment thus formed is sealed by the cover plate 66, attached to extension 65, by the screws 67. A curved leaf spring 68, is hingedly mounted at one end on the pin 69, press fitted into the web of case member 24, and carries a friction member 70, which is riveted thereto in proper position to bear against friction drum 36. Pressure is applied to friction drum 36, through friction member 70, by means of the adjusting screw 71, which is threaded into a boss on extension 65, and contacts with the swinging end of leaf spring 68. A lock nut 72, secures adjusting screw 71, when the friction member is adjusted to give the correct tension on that portion of the film strip passing over the aperture plate. A stop pin 73, also press fitted into the web of case member 24, prevents the operator from applying excessive load to the control shaft 34. It is to be noted that the drag of friction member 70 on drum 36 is independent of centrifugal force and, since it changes little if any with deceleration of the control shaft, this friction drag not only stabilizes film movement over the aperture unit but also dissipates quickly the kinetic energy of the control mechanism, thereby accelerating the closing of the fire shutter should the film strip break between the film actuated and the film actuating sprockets.

The operation of my device is quite obvious from the foregoing description and drawings, but it seems advisable to call attention to certain phases of its adjustment. Film is threaded into the projector mechanism in the manner described in the Letters Patent hereinabove referred to, and the mechanism is started, the film being actuated over the aperture plate by the aperture feed sprocket AF (Fig. 1), which is located in the main frame of the projector below the aperture unit. The leaf spring 49, in the centrifugal mechanism, has already been adjusted to exert a predetermined force tending to prevent the weights 42, from flying outward under centrifugal action, but as soon as the rate of travel of film over the aperture plate reaches a predetermined value, say 80 or 90 percent of normal projection speed, centrifugal force on the weights operates against spring 49 and exerts sufficient pressure between friction members 46 and friction drum 51, to provide the torque required to lift the fire shutter. The film speed at which the fire shutter will open may be regulated by changing the tension of leaf spring 49, but this practice is not recommended since the centrifugal mechanism is adjusted at the factory, to provide safe operation and moreover, there is no point to projecting at any rate other than 90 feet per minute for standard sound film. The fire shutter mechanism alone should provide sufficient drag to insure smooth and flutterless movement of the film over the sound and picture apertures, provided the film is in good condition, but if there should be any tendency for the film strip to make non-uniform contact with the runners on the aperture plate, more tension can be applied quickly to the film by screwing in the adjusting screw 71, which is accessible easily through the back door of the projector mechanism. No further adjustments are necessary, and the mechanism requires no attention and no oiling, once the ball bearings 29 and 32, are packed with grease. If a chain should break from long service, it can be replaced easily and quickly by removing cover plates 16 and 63.

My former automatic fire shutter mechanism, which is operated also by the movement of the film strip over the aperture plate of a non-intermittent projector, functions quite well if lubricant is not allowed to get on the friction discs, but it cannot be used as the sole means for retaining the film strip in contact with the aperture plate; i. e., without tension shoes at the aperture; because its gear train introduces irregularity in the angular velocity of the centrifugal mechanism, thereby causing pulsations in the drag applied to the film. Fig. 9 of United States Letters Patent No. 1,835,159 shows my former centrifugal mechanism, wherein the fire shutter operating pulley 35, is mounted directly on the high speed gear driven shaft 30. Shaft 30, must rotate freely in pulley 35, if the drag on the film strip is to be uniform, but it is essential that little oil be applied to this running fit, otherwise the excess will flow through to the friction discs, and the centrifugal mechanism will not then provide sufficient torque to lift the fire shutter. On the other hand, if this running fit is not sufficiently lubricated, the friction will be irregular and the pulley may even seize on the shaft, thus causing damage to the film strip and rendering the fire shutter inoperative by breaking of the chain. My present device, by eliminating the gears and the necessity for oiling the moving parts, is freed from these defects inherent in the former construction. By using the present centrifugal mechanism, which is somewhat larger and of better design, directly on the control sprocket shaft, it is easily possible and entirely practical to eliminate all pulsations in the drag applied to the film strip above the aperture plate, thus making practical the operation of sound film over sound and picture apertures without using tension shoes at the apertures. The present device is mounted on the mechanism main frame, thus further simplifying the aperture unit and leaving ample room for mounting a complete sound pick-up thereon in the manner described in Letters Patent No. 2,120,249. My improved fire shutter mechanism and automatic means for actuating the same, are simple in construction, safe and fool-proof in operation, require practically no attention from the projectionist, and fulfill the requirements imposed by operating sound film over sound and picture apertures without gate mechanism and tension shoes.

My present device is but one of many forms which obviously may be constructed for use in particular projector mechanisms and it is to be understood that my invention is broader than the present mechanism. The appended claims are drawn to cover any and all devices of the character specified employing the principles herein disclosed, in whatever apparatus they may be used, and the following claims are to be so read and interpreted.

Having thus fully described my invention, what I claim is:

1. A fire shutter control mechanism comprising a supporting structure, a control shaft rotatably mounted therein, a film actuated sprocket fixed on said control shaft, a centrifugal mechanism mounted on said control shaft, means associated with said centrifugal mechanism for operating a fire shutter, a friction drum fixed on said control shaft, and adjustable means independent of said centrifugal mechanism whereby increased drag may be applied through said friction drum to said control shaft for the double purpose of stabilizing the operation of said film actuated sprocket and decelerating said control shaft more quickly should a break occur in the film strip actuating said sprocket.

2. In a fire shutter control mechanism, a constant speed film actuating sprocket positioned in the main frame of a projector below the aperture unit; a film strip in engagement with said sprocket, a control shaft rotatably mounted above said aperture unit, a film actuated sprocket fixed on said control shaft in alignment with said film actuating sprocket and arranged to engage said film strip, a centrifugal mechanism and a friction drum also mounted fixedly on said control shaft, means associated with said centrifugal mechanism for operating a fire shutter, and adjustable brake means bearing upon said friction drum, said brake means serving the purpose of dissipating quickly the kinetic energy of said centrifugal mechanism thereby accelerating the closing of said fire shutter should the film strip break between said sprockets.

3. In a non-intermittent projector mechanism, the combination of a fire shutter mechanism and automatic means for actuating the same, said parts being mounted in fixed position within said projector mechanism, a slidably mounted aperture unit adjustable along the optical axis of said projector mechanism, and means adapted and arranged to cause the film strip to enter at all times upon the aperture plate at its extremity and in a direction tangent to the curved surface thereof no matter where said aperture unit may be positioned with respect to said automatic means for actuating said fire shutter mechanism.

4. In a non-intermittent projector mechanism, the combination of an aperture unit, a fire shutter mechanism, and an automatic fire shutter control mechanism, said control mechanism including a control shaft whereon are mounted a film actuated sprocket, a centrifugally controlled friction means and a friction drum provided with manually adjustable friction means, each of said friction means being adapted and arranged as specified to apply uniform load to said control shaft at normal projection speed, thereby providing such drag on the film strip passing over said aperture unit as to assure continuous and uniform contact between said film strip and the aperture plate on said aperture unit.

5. In combination with a sound and picture aperture unit of the character specified and having a curved aperture plate, a film movement stabilizing device comprising a constant speed film actuating sprocket positioned in the main frame of a projector below said aperture unit, a film strip in engagement with said sprocket, a control shaft rotatably mounted above said aperture unit, a film actuated sprocket fixed on said control shaft in alignment with said film actuating sprocket and arranged to engage said film strip, a friction drum fixedly mounted on said control shaft, and adjustable brake means associated with said friction drum adapted and arranged to tension the film strip between said sprockets thereby retaining said film strip in continuous contact with said curved aperture plate and stabilizing the movement of said film strip between said sprockets.

6. In combination with a sound and picture aperture unit of the character specified and having a curved aperture plate, a film movement stabilizing device comprising a constant speed film actuating sprocket positioned in the main frame of a projector below said aperture unit, a film strip in engagement with said sprocket, a control shaft rotatably mounted above said aperture unit, a film actuated sprocket fixed on said control shaft in alignment with said film actuating sprocket and arranged to engage said film strip, a centrifugal mechanism and a friction drum fixedly mounted on said control shaft, means associated with said centrifugal mechanism for lifting a fire shutter, said means thereby tensioning said film strip between said sprockets, and adjustable brake means associated with said friction drum adapted and arranged to apply additional tension whenever necessary to maintain continuous contact between said film strip and said curved aperture plate.

7. In combination with an aperture unit having a curved aperture plate, a combined fire shutter automatic control and film movement stabilizing device comprising a constant speed film actuating sprocket positioned in the main frame of a projector below said aperture unit, a film strip in engagement with said sprocket, a control shaft rotatably mounted above said aperture unit, a film actuated sprocket fixed on said control shaft in alignment with said film actuating sprocket and arranged to engage said film strip, a centrifugal mechanism and a friction drum fixedly mounted on said control shaft, means associated with said centrifugal mechanism for lifting a fire shutter, said means thereby tensioning said film strip between said sprockets, and adjustable brake means associated with said friction drum adapted and arranged to apply a drag upon said control shaft for the dual purpose of increasing the tension upon the film strip between said sprockets to insure smooth passage thereof over the aperture unit, and of accelerating the closing of the fire shutter should the film strip break or otherwise become damaged at or between said sprockets.

8. An aperture film movement stabilizing device adapted for operation in conjunction with an aperture unit having curved aperture plates without gate mechanism or tension shoes, comprising an aperture feed sprocket arranged to actuate a film strip continuously over said aperture unit, a rotatably mounted control shaft, a film actuated sprocket fixed on said control shaft in alignment with said feed sprocket and operated by the film strip connecting said sprockets, a rotatable member mounted concentric with said control shaft, a gravity actuated fire shutter, flexible means connecting said fire shutter positively with said rotatable member, a centrifugal mechanism mounted on said control shaft, and friction means associated with said centrifugal mechanism and adapted, upon the normal movement of the film strip over said aperture unit, to apply torque to said rotatable member thereby raising said fire shutter and tensioning the film strip between said sprockets so that said film strip will conform accurately and continuously to the curvature of said aperture plates.

ARTHUR J. HOLMAN.